Patented Mar. 28, 1944

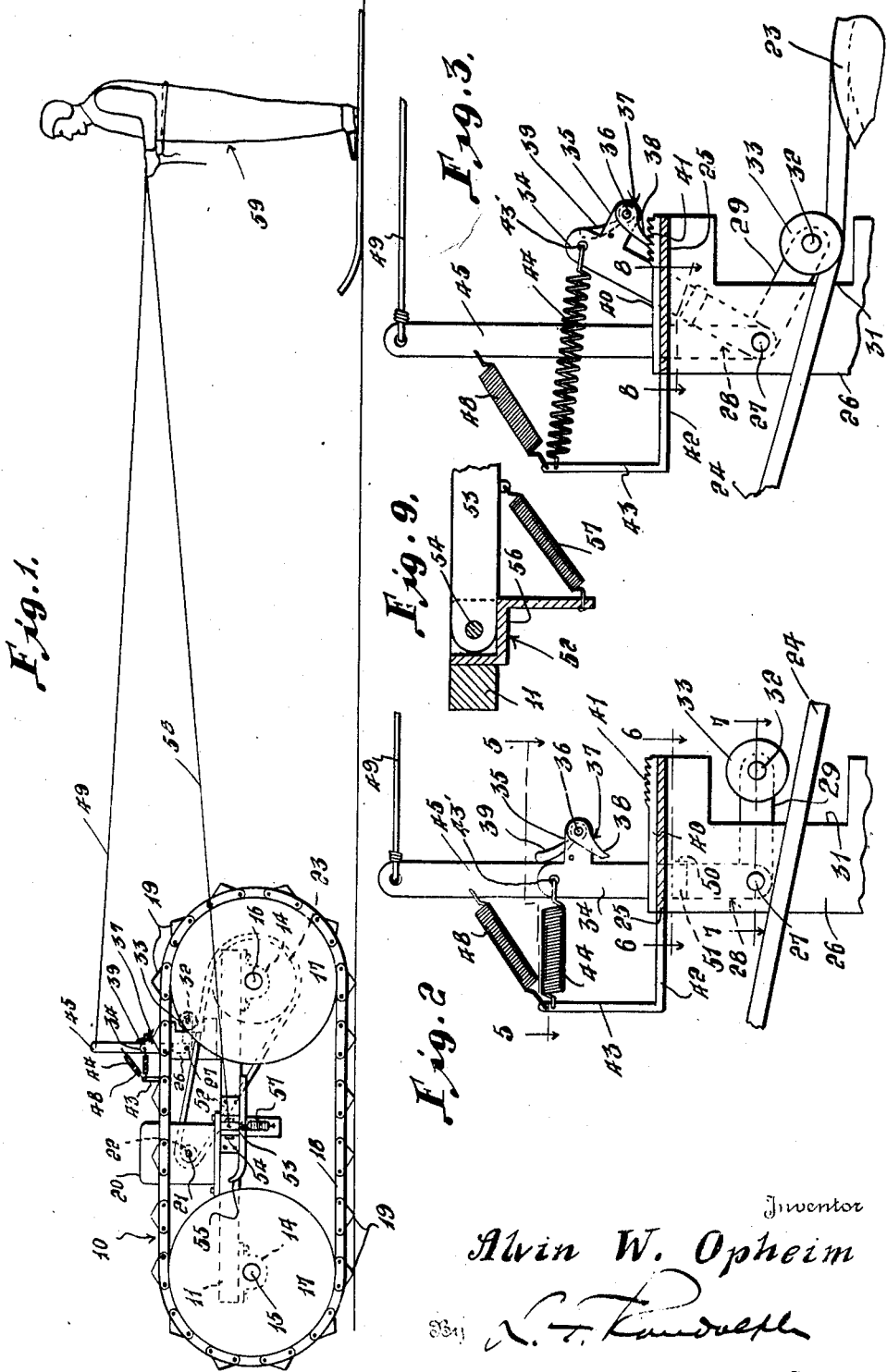

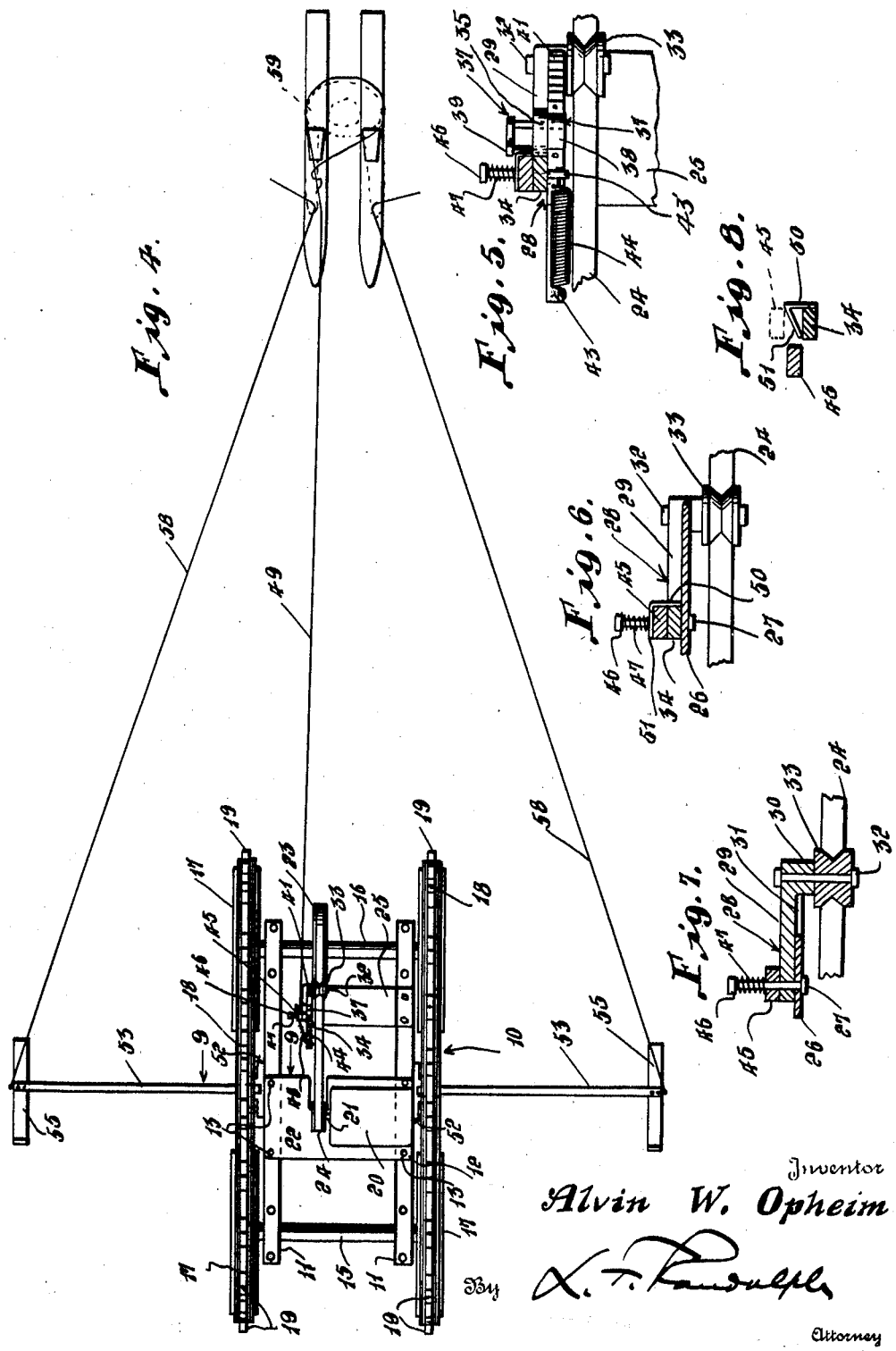

2,345,496

UNITED STATES PATENT OFFICE 2,345,496

TRACTOR

Alvin W. Opheim, Alden, Ill.

Application July 3, 1941, Serial No. 401,011

7 Claims. (Cl. 180—9.1)

This invention relates to a novel construction of tractor, and more particularly to novel means for operating a tractor so that it can be readily controlled by means of cords, cables or other flexible members from a position remote to the tractor.

It is a primary aim of the present invention to provide a tractor of simple construction and of very small size which is adapted for use for pulling a skier, a toboggan or sled, and which can be stopped, started and steered by the skier or by a rider on the toboggan or sled from a position any desired distance behind the tractor.

Still a further aim of the invention is to provide a novel construction of control means whereby a skier, for example, if while being towed by means of the tractor should fall off of his skis the control means would be operated automatically thereby to release the driving means of the tractor so that the skier would not be dragged.

Other objects and advantages of the invention will hereinafter become more fully apparent from the following description of the drawings, which illustrate a preferred embodiment thereof, and wherein:

Figure 1 is a side elevational view of a draft vehicle, constructed in accordance with the invention, and shown in a position ready for use for pulling a skier, Figure 2 is a enlarged fragmentary side elevational view showing the means for controlling the driving means of the draft vehicle, and with the parts shown in a released position, Figure 3 is a view similar to Figure 2 showing the parts in an applied position to cause the draft vehicle to be propelled, Figure 4 is a top plan view of the draft vehicle, Figure 5 is a horizontal sectional view taken substantially along the plane of the line 5—5 of Figure 2, Figure 6 is a horizontal sectional view taken substantially along the plane of the line 6—6 of Figure 2, Figure 7 is a similar view taken substantially along the plane of the line 7—7 of Figure 2, Figure 8 is a horizontal sectional view taken substantially along the plane of the line 8—8 of Figure 3, and Figure 9 is an enlarged transverse vertical sectional view, partly in elevation, taken substantially along the plane of the line 9—9 of Figure 4.

Referring more particularly to the drawings, wherein like reference characters designate like or corresponding parts throughout the different views, 10 designates generally a small draft vehicle of the tractor type and which includes side rails 11 connected in spaced apart parallel relationship by means of a cross plate 12 which is secured by means of fastenings 13 at its ends to the side rails 11, intermediate of the ends thereof. The side rails 11, at their front and rear ends, are provided with depending bearings 14. The bearings of the corresponding ends of the rails 11 are alined and in one pair of said bearings is journaled a front axle 15, and in the other pair of bearings is journaled a rear axle 16. The ends of the axles 15 and 16 project beyond the rails 11 and are provided at their ends with wheels 17 which are disposed on the outer sides of the rails 11. An endless tread 18 is trained over the wheels 17 which are disposed at each side of the tractor 10, and said treads are preferably provided with cleats or other anti-skid means 19 which project outwardly therefrom to afford traction for the treads 18, as the tractor 10 is adapted to be used in snow, as will hereinafter become apparent.

A prime mover 20, such as an electric motor or gasoline engine is secured to the plate 12 and transversely of the tractor 10, and is provided with a driven shaft 21 to which is keyed a pulley 22. A pulley 23 is keyed to the rear axle 16, between the side rails 11 and in longitudinal alinement with the pulley 22. A belt 24 is loosely trained over the pulleys 22 and 23.

A plate 25 is fastened at one end thereof to the upper side of one of the rails 11 and extends transversely of the tractor 10 toward the other rail 11. The plate 25 is disposed between the plate 12 and the rear axle 16 and extends between the upper and lower portions of the belt 24 and is provided at its free end with an upright standard portion 26, as best seen in Figures 2 and 3. As best seen in Figure 7, a bolt 27 extends outwardly through the standard portion 26. An L-shaped lever 28 is pivotally mounted at its apex on the bolt 27 and on the outer side of the standard 26. The shorter, lower arm 29 of the lever 28 is provided with an inwardly projecting enlargement 30, at its free end which projects into a cut-out portion 31 in the standard 26. A pin or axle 32 extends through the enlarged portion 30 to provide a journal for a belt tightener pulley 33 which is disposed beyond the inner, free end of the enlarged portion 30 and above and adjacent the upper portion of the belt 24. The other, longer arm 34 of the lever 28 projects upwardly to a point substantially above the level of the upper edge of the standard 26, and is provided, adjacent its upper end, with a rearwardly projecting extension 35. A pin 36 extends through and is journaled in the rear, free end of the extension 35, and forms a part of a latch element, designated generally 37. Latch element 37 includes a pawl 38 and an arm 39. Pawl 38 is secured to one end of the pin 36 and is spaced inwardly from the arm 34, and arm 39 is secured to the other end of pin 36 and is spaced outwardly from arm 34. Pawl 38 extends forwardly and downwardly and arm 39 extends forwardly and upwardly.

The standard 26 is provided, at its upper end, with a horizontally disposed bar 40 which is provided adjacent its rear end with a series of upwardly projecting teeth 41. A bracket 42 is attached to the bar 40 and projects forwardly of the standard 26 and terminates in an upwardly projecting forward end 43. A contractile coil spring 44 is anchored at one end to the end 43 of the bracket 42 and is attached at its opposite end to a pin 43' on the upper end of the lever arm 34 for urging the lever 28 to swing in a counterclockwise direction, as seen in Figure 2, to cause its arm 29 to be swung upwardly for moving the belt tightener pulley 33 upwardly and away from the belt 24.

A lever 45 is pivotally mounted at its lower end on the bolt 27 and on the outer side of the lever 28. The outer end of the bolt 27 is provided with a nut 46 which forms an abutment for an expansion coil spring 47 which is carried by the bolt 27 and which urges the lever 45 inwardly for yieldably holding it against the lever 28. As best seen in Figure 2, lever 45 projects substantially above the upper end of the lever arm 34. A contractile coil spring 48 is anchored at one end thereof to the upper end of the bracket portion 43 and is attached at its opposite end to the lever 45, near its upper end and substantially above the upper end of the lever arm 34, for urging the lever 45 forwardly relatively to the tractor 10. A flexible member, such as a cord or cable 49, is attached to the upper end of the lever 45 and projects rearwardly therefrom, for a purpose which will hereinafter become apparent.

As best seen in Figure 6, the lever arm 34, intermediate of its ends, is provided with a spring catch 50 which comprises an angular shaped piece of spring metal, one end of which is suitably secured, as by means of welding, to the back edge of the lever arm 34. Said secured end projects outwardly relatively to the lever arm 34, and the other end of the hook or catch 50 projects forwardly from the outer end of the secured end. Said last mentioned end 51, as seen in Figure 8, normally springs inwardly and into a position with its free end engaging against the outer side of the lever arm 34, but is adapted to be pulled outwardly to engage over the lever 45, as seen in Figure 6.

The rails 11, intermediate of their ends, are provided on their outer sides with brackets 52 to which are pivotally connected arms 53 by means of pins or bolts 54. The arms 53 project outwardly from the sides of the tractor 10. Runners 55 are attached to the under sides of the outer ends of the arms 53 and are arranged parallel to the longitudinal axis of the tractor 10. As seen in Figure 9, the brackets 52 are each provided with a substantially flat under portion 56 on which the inner end of the arm 53 is adapted to rest for supporting the arm in substantially a horizontal position. A contractile spring 57 is anchored at one end to each bracket 52, below its arm 53, and is attached at its opposite end to the arm 53 for yieldably urging the arm 53 downwardly. It will thus be seen that the springs 57 and the portions 56 combine to maintain the arms 53 in horizontal positions and in alinement with one another. A flexible member 58, such as a cord or cable is attached to the outer end of each of the arms 53, and said flexible members project rearwardly therefrom, as best seen in Figure 4.

As illustrated in the drawings, Figures 1 and 4, the tractor 10 is adapted for use for pulling a skier, as seen at 59. The tractor 10 is controlled entirely by the skier by means of the flexible members 49 and 58. In order to put the towing device into use, the engine or motor 20 is started while the L-shaped lever 28 is in a released position, as seen in Figure 2. The catch or hook 50 is engaged over the lever 45, as seen in Figure 6, so that the levers 28 and 45 will be disposed in the positions, as seen in Figure 2, in which positions the springs 44 and 48 will be retracted and not under tension. Due to the fact that the belt tightener pulley 33 is out of engagement with the belt 24, the rear axle 16 will not be driven by the prime mover 20. The skier 59 then positions himself behind the tractor 10, at any desired distance, and attaches the free end of the flexible member 49 around his waist and grasps the left hand flexible member 58 in his left hand and the right hand flexible member 58 in his right hand, as seen in Figure 4. The skier by leaning backward will exert a pull on the flexible member 49 to swing the lever 45 rearwardly thus causing the lever 28 to be swung in a clockwise direction, as seen in Figure 2, to cause the belt tightener pulley to engage the belt 24 for tensioning the belt so that it will drive the pulley 23 for driving the treads 18 to cause the tractor 10 to move forwardly. The pawl 38 is disposed in longitudinal alinement with the teeth 41 so that when the arm 34 of the lever 28 has been swung rearwardly, as just previously described, the pawl 38 of the latch 37 will engage between two of the teeth 41 for latching the lever 28 in the position, as seen in Figure 3. The skier can then resume his normal upright position and the spring 48 will pull the lever 45 forwardly and to its position, as seen in Figure 3, and out of engagement with the catch 50, which will assume the position, as seen in Figure 8. The tractor 10 is adapted to be constructed so that it will be sufficiently light in weight to permit it being bodily turned by the skier pulling on either of the flexible members 58 for changing the direction of movement of tractor 10. Thus, the skier by exerting a pull with his right arm on the right flexible member 58 will turn the tractor to the right or the tractor can be turned to the left by a pull with the left arm on the left flexible member 58. The arms 53 in addition to functioning to provide leverage for steering the tractor 10 also support the runners 55 which are adapted to engage the ground, or rather the snow covering the ground, should the tractor 10 tilt laterally to prevent the tractor from overturning. When either of the runners 55 strike the snow, not shown, its arm 53 will be permitted to yield upwardly by its spring 57 which spring will function to cushion the shock of the lateral tilting of the tractor 10 and tend to return it to its normal upright position. Should the skier desire to stop, this can be accomplished by leaning the body rearwardly for pulling back on the lever 45. As the lever 45 moves rearwardly it will ride over the outer side of the end 51 of the catch 50 and will slide outwardly and away from the lever 28 so that the lever 45 (Fig. 8) can engage the arm 39 of the latch 37 to swing the pawl 38 upwardly and out of engagement with the teeth 41 to allow the spring 44 to return the L-shaped lever 28 to its position, as seen in Figure 2, to stop the forward motion of the tractor 10. It will thus be apparent that the skier is towed by means of the flexible members 58 and the flexible member 49 is used only for starting and stopping the tractor. It will likewise be obvious that should the skier fall he will automatically exert a pull on the flexible member 49 for stopping the tractor, as just previously described.

It is to be understood that only one embodiment of the applicant's invention has been disclosed, and that draft vehicles of various sizes could be provided for drawing toboggans and sleds, or for any other purpose. Also, the same principle of controlling a motor propelled machine by means of flexible members could be utilized in connection with boats used to tow aquaplanes and also in conjunction with various wheeled vehicles which could be used for towing roller skaters and the like.

Various modifications and changes are contemplated and may obviously be resorted to as only a preferred embodiment of the invention has been disclosed.

I claim as my invention:

1. A remote control means for tractors comprising a relatively light tractor having a prime mover, a belt for connecting said prime mover to a ground engaging member of the tractor for propelling the tractor, a belt tightener pulley, means for swingably mounting said belt tightener pulley for moving it into and out of engagement with the belt, a latch carried by said means for holding the belt tightener pulley in an applied position for holding the belt tight for driving said ground engaging member, a spring for urging the belt tightener pulley to a released position, a lever pivotally mounted on the tractor, and a flexible member projecting from the free end of said lever, said flexible member being adapted to be pulled rearwardly of the tractor for engaging said means for moving the belt tightener pulley to an applied position or for engaging said latch for releasing said means to permit the spring to move the belt tightener pulley to a released position.

2. A tractor as in claim 1, comprising arms projecting outwardly from the sides of said tractor, and flexible members connected to the ends of said arms and extending rearwardly and adapted to be pulled in a rearward direction relatively to the tractor for turning it bodily by main force.

3. A tractor as in claim 1, comprising arms projecting outwardly from the sides of said tractor, flexible members connected to the ends of said arms and extending rearwardly and adapted to be pulled in a rearward direction relatively to the tractor for turning it bodily by main force, and runners attached to the free ends of said arms for maintaining the tractor in an upright position.

4. A tractor of relatively small size having endless treads, said tractor being provided with a prime mover, a belt for driving said treads from the prime mover, means, adapted to be actuated by a flexible member when positioned remote to the tractor, a belt tightener pulley actuated by said means for engaging the belt to cause the treads to be driven by the prime mover, latch means for holding the belt tightener pulley in an applied position, spring means for moving the belt tightener pulley to a released position when said latch means is released, and means adapted to be actuated by the flexible member from a position, remote to the tractor, for releasing said latch means so that the spring can move the belt tightener pulley to a released position for stopping the forward motion of the tractor.

5. A tractor as in claim 4, comprising arms projecting outwardly from the sides of said tractor and adapted to be connected at their ends to flexible members whereby the tractor may be bodily turned by a pull on one or the other of said last mentioned flexible members for changing the direction of movement of the tractor.

6. A draft vehicle having caterpillar treads, a prime mover, a belt for driving the endless treads from the prime mover, an L-shaped lever pivotally mounted at its apex to the tractor, a belt tightener pulley journaled on one end of said lever, a latch element pivotally connected to the opposite end of said lever, a toothed rack mounted on the tractor and arranged to be engaged by said latch element, when the lever is disposed to position the belt tightener pulley in an applied position against the belt, for holding the belt tightener pulley in engagement with the belt to cause the tractor to be propelled by the prime mover, spring means connected to the last mentioned end of said lever for urging the belt tightener pulley to a released position, a lever pivotally mounted at one end thereof to the tractor, a flexible member connected to the opposite end of said last mentioned lever for urging it rearwardly, spring means for urging said last mentioned lever forwardly, a hook having a free end, said hook being connected to said L-shaped lever and being adapted to be detachably connected to the second mentioned lever so that the belt tightener will be moved to an applied position when the last mentioned lever is pulled rearwardly, said last mentioned spring acting to pull the last mentioned lever forwardly and out of engagement with the hook, when the pull on the last mentioned lever is released, said L-shaped lever being retained in a rearward position by its latch engaging the toothed rack, and said free end of the hook being resilient to spring inwardly and against the L-shaped lever, when released from said last mentioned lever, so that when the last mentioned lever is again pulled rearwardly, said hook will form a cam for directing the last mentioned lever into a position to engage and release the latch element so that the first mentioned spring can move the belt tightener pulley to a released position.

7. A draft vehicle having a prime mover connected to ground-engaging members by means of a belt, a belt tightener pulley, flexible means actuated by a pull thereon from a position remote to the prime mover for applying the belt-tightener pulley to the belt or for releasing it therefrom to cause ground-engaging members to be driven by the prime mover or to cease to be driven thereby, comprising arms projecting outwardly from the sides of the vehicle and disposed in substantially horizontal planes, runners connected to the free ends of said arms for maintaining the vehicle in an upright position, and means for exerting a pull, from a remote position relatively to the vehicle, on the outer ends of said arms for bodily turning the vehicle for changing its direction of movement.

ALVIN W. OPHEIM.